No. 653,659. Patented July 17, 1900.
R. CHILLINGWORTH.
BELT PULLEY.
(Application filed Jan. 31, 1899.)
(No Model.)
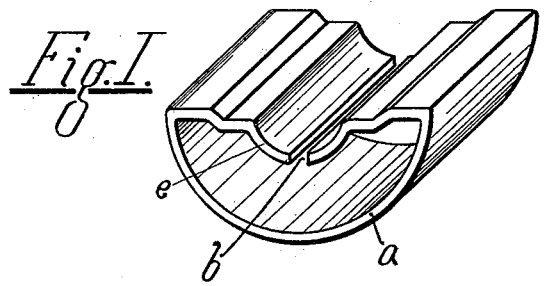
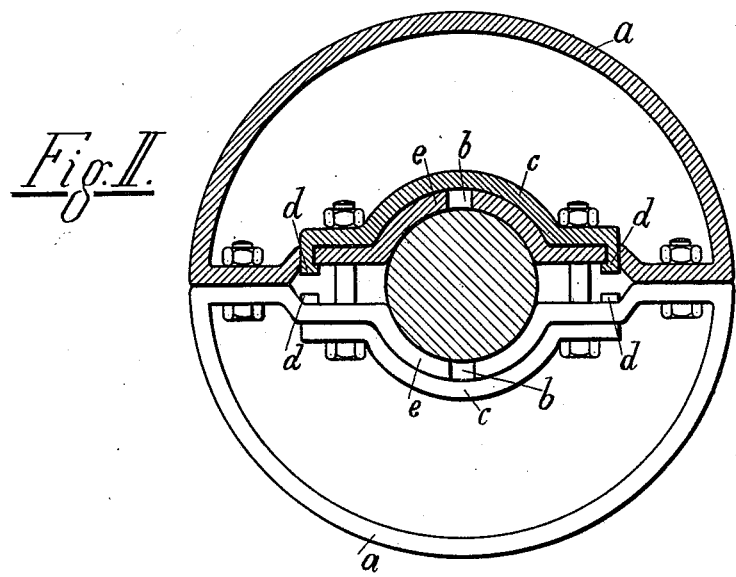
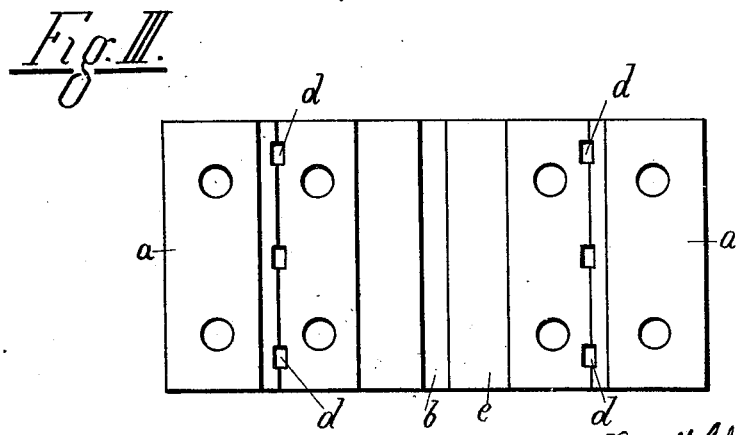
WITNESSES:
Ella L. Giles
INVENTOR
Rudolf Chillingworth
BY
Richards
ATTORNEYS

UNITED STATES PATENT OFFICE.

RUDOLF CHILLINGWORTH, OF NUREMBERG, GERMANY.

BELT-PULLEY.

SPECIFICATION forming part of Letters Patent No. 653,659, dated July 17, 1900.

Application filed January 31, 1899. Serial No. 704,058. (No model.)

*To all whom it may concern:*

Be it known that I, RUDOLF CHILLINGWORTH, a subject of the King of Bavaria, residing at Nuremberg, Germany, have invented certain new and useful Improvements in Belt-Pulleys, of which the following is a specification.

Sheet-metal disk wheels, particularly the two-part pulleys made of sheet-metal tubes or strips, are open to the objection that on account of the uniform thickness of wall of the sheet-metal tubing or strips employed said pulleys cannot be made with reinforced center or hub adapted to stand the strain. The present invention aims at obviating this deficiency by providing a space in the hub of each semicircular half of the pulley $a$ along the semicylindrical hub-cavity and then connecting the two portions of the shell on opposite sides of the space by means of a metal brace $c$, fitted under pressure to the shape of the hub and inserted in the tube, said brace $c$ engaging at both extremities into corresponding openings of the hub-surfaces by means of projections.

A sheet-metal disk wheel of this kind provided with a reinforced hub is illustrated in Figure I of the accompanying drawings in one form. Fig. II is a part side and part sectional view of the invention, and Fig. III is a plan view of part of the pulley.

Each half of the sheet-metal disk wheel, Fig. I, is first provided with a space $b$ along the wall of the hub-cavity $e$, or a sheet-metal strip is bent to the shape represented in Fig. I in such a manner that its ends are separated from each other by the space $b$. A strong metal brace $c$, Fig. II, is then inserted into each half of the pulley, the brace having been fitted precisely by pressure to the hub shape of the disk and engaging into corresponding openings of the hub by means of the projections $d$ at both its extremities. Two pulley-halves provided in such a manner with reinforced hubs are then secured together in the usual manner and keyed upon the shaft. The space $b$ allows the two portions of the hub-section on opposite sides thereof to be drawn together under pressure to be held by the brace or reinforcing-piece. Thus the parts are placed under strain and are securely held together.

I claim—

1. A pulley formed in halves, each of which has a hub portion provided with a space $b$ extending along it, and a brace extending across the slot in each hub portion and connected with the portions of the hub-section on opposite sides of the slot, substantially as described.

2. In combination, with the pulley having the hub with the space $b$ extending along it, a brace $c$ fitted to said hub and having projections engaging openings in the hub-section of the pulley, substantially as described.

3. In combination, the pulley-halves having their hub portions each provided with a space $b$, the braces $c$ fitted to the hub parts and having projections engaging openings in the pulley-hub section and means for securing the parts together, substantially as described.

In witness whereof I have hereunto set my hand in presence of two witnesses.

RUDOLF CHILLINGWORTH.

Witnesses:
ANDREAS STIER,
OSCAR BOCK.